(12) United States Patent
Hashimoto et al.

(10) Patent No.: US 8,102,066 B2
(45) Date of Patent: Jan. 24, 2012

(54) INVERTER GENERATOR

(75) Inventors: Shoji Hashimoto, Wako (JP); Kazufumi Muronoi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 377 days.

(21) Appl. No.: 12/502,876

(22) Filed: Jul. 14, 2009

(65) Prior Publication Data

US 2010/0019508 A1 Jan. 28, 2010

(30) Foreign Application Priority Data

Jul. 25, 2008 (JP) ................................. 2008-191782
Jul. 25, 2008 (JP) ................................. 2008-191783

(51) Int. Cl.
 *H02P 9/04* (2006.01)
(52) U.S. Cl. ........................... 290/40 C; 290/52; 363/34
(58) Field of Classification Search ................ 290/40 C, 290/52; 363/34
 See application file for complete search history.

(56) References Cited

U.S. PATENT DOCUMENTS

| | | | |
|---|---|---|---|
| 5,943,221 A | 8/1999 | Asai et al. | |
| 6,801,019 B2 * | 10/2004 | Haydock et al. | 322/17 |
| 6,879,053 B1 | 4/2005 | Welches et al. | |
| 6,965,818 B2 * | 11/2005 | Koenig et al. | 701/36 |
| 7,123,495 B2 * | 10/2006 | Endou et al. | 363/98 |
| 7,245,036 B2 * | 7/2007 | Endou et al. | 290/40 A |
| 7,965,063 B2 * | 6/2011 | Hashimoto et al. | 322/37 |
| 2008/0116695 A1 | 5/2008 | Peterson | |

FOREIGN PATENT DOCUMENTS

| | | |
|---|---|---|
| EP | 1 394 928 A2 | 3/2004 |
| EP | 2148428 A2 * | 1/2010 |
| JP | 4-355672 A | 12/1992 |
| JP | 11-308896 A | 11/1999 |

* cited by examiner

*Primary Examiner* — Joseph Waks
(74) *Attorney, Agent, or Firm* — Arent Fox LLP

(57) ABSTRACT

In an inverter generator, having a generator unit driven by an internal combustion engine whose throttle valve is moved by an actuator and generates alternating current, and an inverter that converts converted direct current to alternating current with switching elements to supply to an electrical load, voltage and current supplied to the electrical load is detected, a power factor is calculated from the detected voltage and the current, a power of the load is estimated from the detected current and the calculated power factor. Then a desired speed of the engine is determined based on the estimated power of the load, and the actuator is controlled such that an engine speed becomes equal to the desired engine speed, thereby improving the response of engine speed control.

12 Claims, 7 Drawing Sheets

INVERTER GENERATOR

BACKGROUND OF THE INVENTION

1. Field of the Invention

This invention relates to an inverter generator, particularly to an inverter generator equipped with a generator unit driven by an internal combustion engine, in which speed of the engine is controlled in accordance with load.

2. Description of the Related Art

One well-known inverter generator once converts the alternating current outputted by an engine-driven generator unit to direct current and then converts the direct current into alternating current of a predetermined frequency (utility frequency) by driving switching elements with a PWM signal generated using a reference sine wave of the desired output voltage waveform and a carrier. Examples of such an inverter generator can be found in Japanese Laid-Open Patent Application Nos. H11(1999)-308896 ('896) and H4(1992)-355672 ('672).

The reference '896 teaches a technique to detect a turn-on angle of a thyristor and control engine speed so that the detected angle becomes a desired turn-on angle.

SUMMARY OF THE INVENTION

In the reference '896, although, as described above, a load, more specifically the power supplied to the load is estimated from the turn-on angle of the thyristor of a converter and the engine speed is controlled based thereon, it is difficult to accurately estimate the load power, especially in the case of a light load, because the rotational fluctuation of the engine is directly transmitted during a period of transient of alternator output voltage. Accordingly, the response of engine speed control is not necessarily satisfactory.

A first object of this invention is therefore to overcome the aforesaid problem by providing an inverter generator that estimates load power from a power factor or the like, instead of turn-on angle, and calculates a desired engine speed based thereon, thereby improving the response of engine speed control.

Further, loads that can be connected to an inverter generator according to '672 include a load of low power factor, such as a mercury lamp. Since the power factor of such a load is poor until the current becomes stable, the inrush current at start is large and hence, the generator tends to be overload at start. As a result, the number of the low power factor loads which can be started by the rated generator output is disadvantageously smaller than that when the current becomes stable after started.

A second object of this invention is therefore to overcome the aforesaid problem by providing an inverter generator that enables to increase the number of low power factor loads which can be started by the rated output to the utmost extent, as well as improving the response of engine speed control.

In order to achieve the first object, this invention provides an inverter generator having a generator unit that is driven by an internal combustion engine whose throttle valve is moved by an actuator and generates alternating current, a converter that is connected to the generator unit and converts the alternating current to direct current, an inverter that is connected to the converter and converts the direct current to alternating current with switching elements to supply to an electrical load, comprising: a voltage/current detector that detects voltage and current supplied to the electrical load; a power factor calculator that calculates a power factor based on the detected voltage and the current; a load power estimator that estimates a power of the load based on at least the detected current and the calculated power factor; a desired engine speed determiner that determines a desired speed of the engine based on the estimated power of the load; and an actuator controller that controls operation of the actuator such that an engine speed becomes equal to the desired engine speed.

In order to achieve the second object, this invention provides an inverter further including: an inverter driver that drives the switching elements with a PWM signal generated using a reference sine wave of a waveform of a desired output voltage and a carrier and makes the alternating current converted in the inverter to the alternating current of a predetermined frequency; and a load power factor discriminator that discriminates whether the calculated power factor of the load is less than a predetermined value; and the inverter driver decreases the desired output voltage by a predetermined value in a lump when the calculated power factor of the load is less than the predetermined value, and then decreases the desired output voltage continuously by the predetermined value which is successively reduced by a decrement.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

An inverter generator according to embodiments of this invention will now be explained with reference to the attached drawings.

Figure 1:
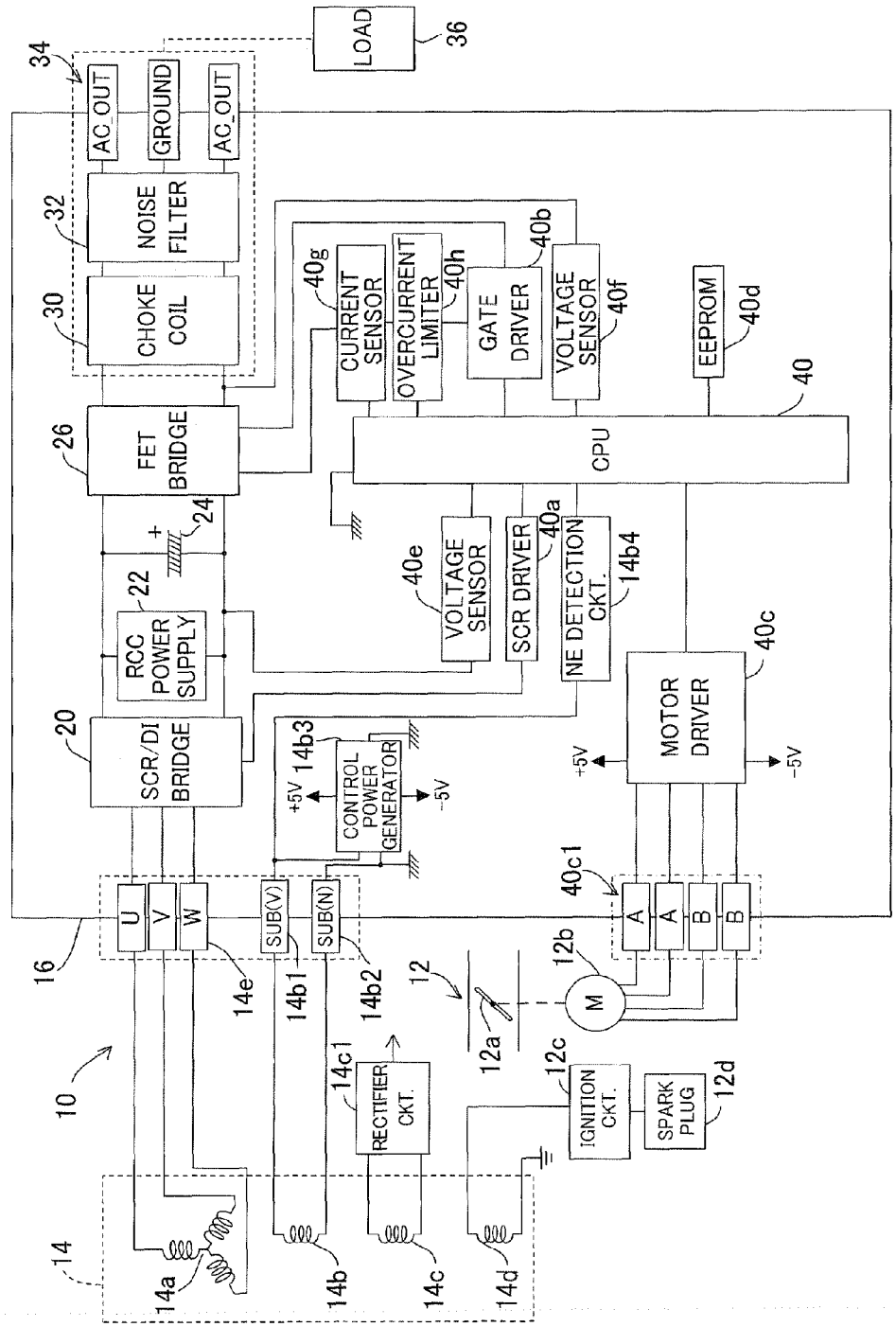
FIG. 1 is a block diagram giving an overview of an inverter generator according to a first embodiment of this invention.

FIG. 1 is a block diagram giving an overview of an inverter generator according to a first embodiment of this invention.

The inverter generator is designated by reference numeral 10 in FIG. 1. The generator 10 is equipped with an engine (internal combustion engine) 12 and has a rated output of about 2.6 kW (AC 100 V, 30 A). The engine 12 is an air-cooled, spark-ignition engine. Its throttle valve 12a is opened and closed by a throttle motor (actuator) 12b constituted as a stepper motor. The engine 12 is started with a recoil starter (not shown).

A circular stator (not shown) is fastened near the cylinder head of the engine 12. The stator is provided with windings that constitute an engine generator unit 14, namely with three-phase (U, V and W) output windings (main windings) 14a and three single-phase windings 14b, 14c and 14d.

A rotor (not shown) that doubles as the flywheel of the engine 12 is installed in the outside of the stator. Permanent magnets (not shown) are attached in the rotor at positions opposite the aforesaid windings 14a, etc., and with their radially oriented polarities reversed alternately.

When the permanent magnets of the rotor surrounding the stator rotate, three-phase (U, V and W phase) alternating current is outputted from (generated by) the three-phase output windings 14a and single-phase alternating current is outputted from the single-phase output windings 14b, 14c and 14d.

The three-phase alternating current outputted from (generated by) the output windings 14a of the generator unit 14 is passed through U, V and W terminals 14e to a control board (printed board) 16 and inputted to a converter 20 mounted thereon. The converter 20 is equipped with bridge-connected three thyristors (SCRs) and three diodes DI. The three-phase alternating current outputted by the generator unit 14 is converted to direct current by controlling the conduction angles of the thyristors.

A ringing choke converter (RCC) power supply (direct current stabilized power supply) 22 is connected to the positive and negative electrode side outputs of the converter 20 and supplies the rectified DC power to the three thyristors as operating power. A smoothing capacitor 24 is connected downstream of the RCC power supply 22 to smooth the direct current outputted from the converter 20.

An inverter 26 is connected downstream of the smoothing capacitor 24. The inverter 26 is equipped with a four-FET bridge circuit (FET: field effect transistor (switching element)). As explained further below, the direct current outputted from the converter 20 is converted to alternating current of a predetermined frequency (50 Hz or 60 Hz utility power frequency) by controlling the conducting (ON-OFF) state of the four FETs.

The output of the inverter 26 is passed through a choke coil 30 composed of an LC filter for harmonic suppression and through a noise filter 32 for noise suppression to be applied to output terminals 34, from which it can be supplied to an electrical load 36 through a connector (not shown) or the like.

The control board 16 is equipped with a CPU (central processing unit) 40 having a 32-bit architecture. The CPU 40 controls the conduction angle of the thyristors of the converter 20 though a thyristor (SCR) driver (drive circuit) 40a, the conducting state of the FETs of the inverter 26 through a gate driver 40b, and the operation of the throttle motor 12b through a motor driver 40c. The CPU 40 is equipped with an EEPROM (nonvolatile memory) 40d.

The output of the first single-phase output winding 14b is sent to the control board 16 through sub-terminals 14b1 and 14b2, where it is inputted to a control power generator 14b3 that generates 5 V operating power for the CPU 40. The output from the sub-terminal 14b1 is sent to an NE detection circuit 14b4, where it is converted to a pulse signal and sent to the CPU 40. The CPU 40 counts the pulses of the output from the NE detection circuit 14b4 and calculates (detects) the speed NE of the engine 12.

The output of the second output winding 14c is sent to a full-wave rectifier circuit 14c1, where it is full-wave rectified to produce operating power for, inter alia, the throttle motor 12b. The output of the third output winding 14d is sent to an ignition circuit 12c of the engine 12 for use as ignition power for a spark plug 12d.

The CPU 40 is connected to first and second voltage sensors 40e and 40f. The first voltage sensor 40e on downstream of the RCC power supply 22 produces an output or signal proportional to the DC voltage output of the converter 20. The second voltage sensor 40f on downstream of the inverter 26 produces an output or signal proportional to the AC voltage output of the inverter 26. The outputs of the first and second voltage sensors 40e and 40f are sent to the CPU 40.

The CPU 40 is further connected to a current sensor 40g. The current sensor 40g produces an output or signal proportional to the current outputted from the inverter 26, i.e., the current passing through the electrical load 36 when the load 36 is connected.

The output of the current sensor 40g is inputted to the CPU 40 and also to an overcurrent limiter 40h constituting a logic circuit (hardware circuit) independent of the CPU 40. When the current detected by the current sensor 40g exceeds the tolerance limit, the overcurrent limiter 40h terminates the output of the gate driver 40b to make the output of the inverter 26 zero temporarily.

The CPU 40 is inputted with the outputs of the first and second voltage sensors 40e, 40f and current sensor 40g and based thereon, PWM-controls the FETs of the inverter 26, while controlling the operation of the throttle motor 12b, thereby further limiting overcurrent.

Figure 2:
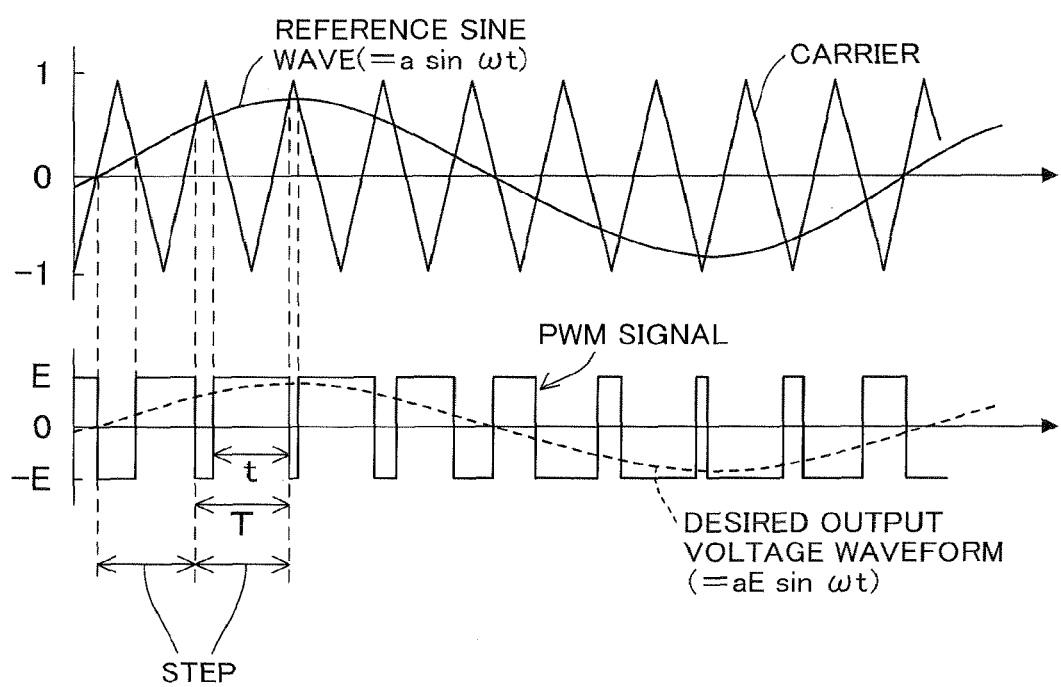
FIG. 2 is a waveform diagram for explaining a PWM control by a CPU shown in FIG. 1.

FIG. 2 is a waveform diagram for explaining the PWM control by the CPU 40.

The PWM control of the FETs of the inverter 26 will be explained with reference to FIG. 2. Based on a reference sine wave (signal wave) with respect to the predetermined frequency (50 Hz or 60 Hz utility power frequency) of the desired AC output voltage waveform (lower broken-line wave), the CPU 40 uses a comparator (not shown) to compare it with a carrier (e.g., a 20 kHz carrier wave), produces a PWM signal (PWM waveform), namely a variable duty ratio (=ON time t/period T) pulse train, in accordance with PWM (pulse width modulation), and outputs the signal through the gate driver 40b.

The lower broken-line wave in FIG. 2 indicates the desired output voltage waveform. The period T (step) of the PWM signal (PWM waveform), which is actually much shorter than shown, is enlarged in FIG. 2 for ease of understanding.

The CPU 40 determines the opening of the throttle valve 12a to establish the desired engine speed calculated based on the AC output determined by the electrical load 36, calculates A phase and B phase output pulses for the throttle stepper motor 12b, and supplies them through the motor driver 40c to the motor 12b from output terminals 40c1, thereby controlling the operation of the motor 12b.

Figure 3:
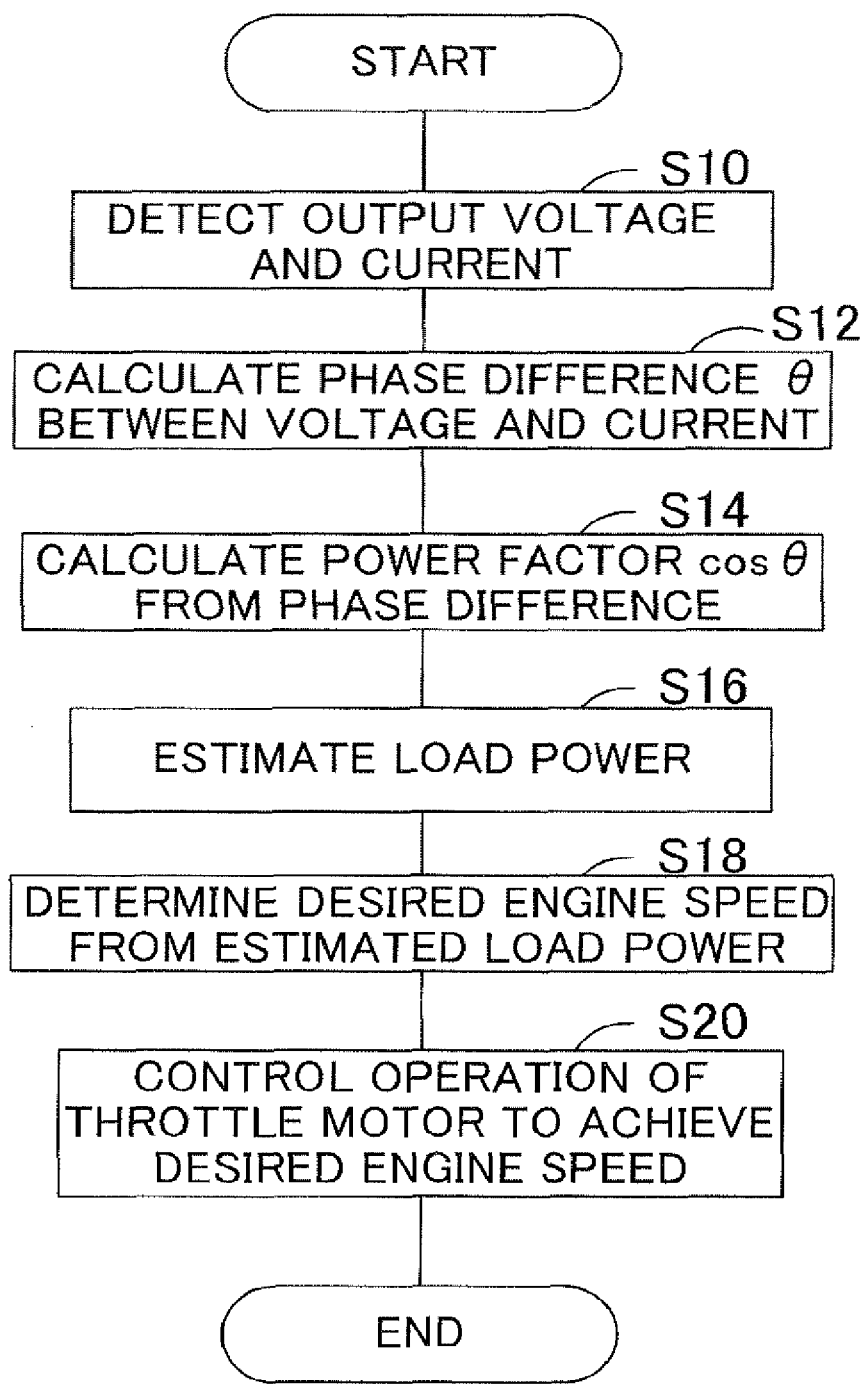
FIG. 3 is a flowchart showing the operation of output voltage limit control conducted by the CPU shown in FIG. 1.

FIG. 3 is a flowchart showing the operation conducted by the CPU 40. The illustrated program is executed every control cycle (step) defined by the carrier frequency, more exactly, every 50 microseconds in the case where the frequency of the desired output voltage waveform is 50 Hz, for example.

The program begins in S10, in which the voltage and current of the alternating current outputted from the inverter 26, i.e., the voltage and current supplied to the electrical load 36 when the load 36 is connected are detected based on the outputs of the second voltage sensor 40f and current sensor 40g.

The program proceeds to S12, in which a phase difference θ between the detected voltage and current is calculated, and to S14, in which a power factor cos θ is calculated from the obtained phase difference θ.

The program proceeds to S16, in which a power of the load is estimated in accordance with the following equation.

Estimated load power=Rated output voltage ($V$)×Detected current ($A$)×Power factor (cos θ)

In the above, the rated output voltage is AC 100 (V).

Figure 4:
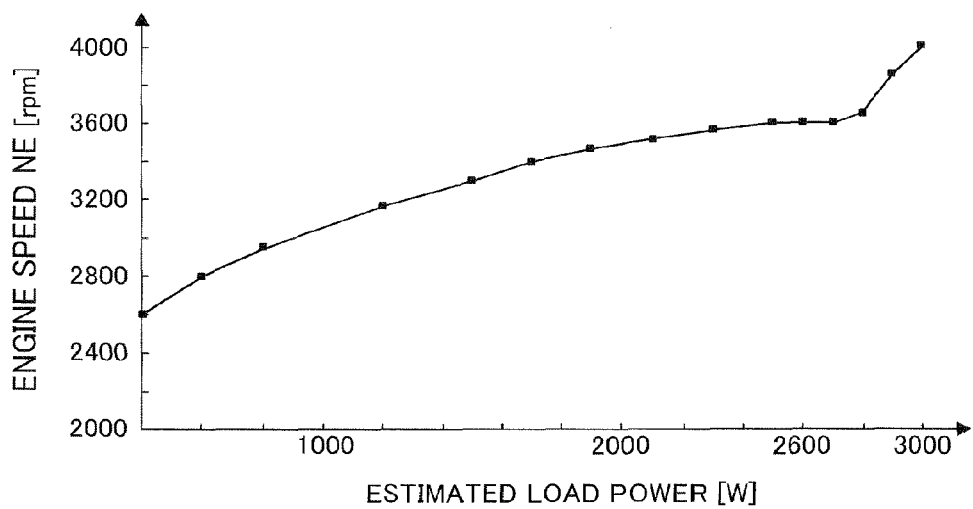
FIG. 4 is an explanatory view for expressing table characteristics of desired engine speed used in the operation of the FIG. 3 flowchart.

The program next proceeds to S18, in which the desired engine speed of the engine 12 is determined based on the estimated load power. Specifically, the desired engine speed is determined by retrieving table values whose characteristics are shown in FIG. 4, using the estimated load power. As illustrated, the desired engine speed is determined such that the desired engine speed increases with increasing estimated load power.

The program then proceeds to S20, in which the operation of the throttle motor 12b is controlled to achieve the determined desired engine speed. More precisely, the operation of the throttle motor 12b is feedback-controlled so that the engine speed detected by the NE detection circuit 14b4 becomes equal to the desired engine speed.

Figure 5:
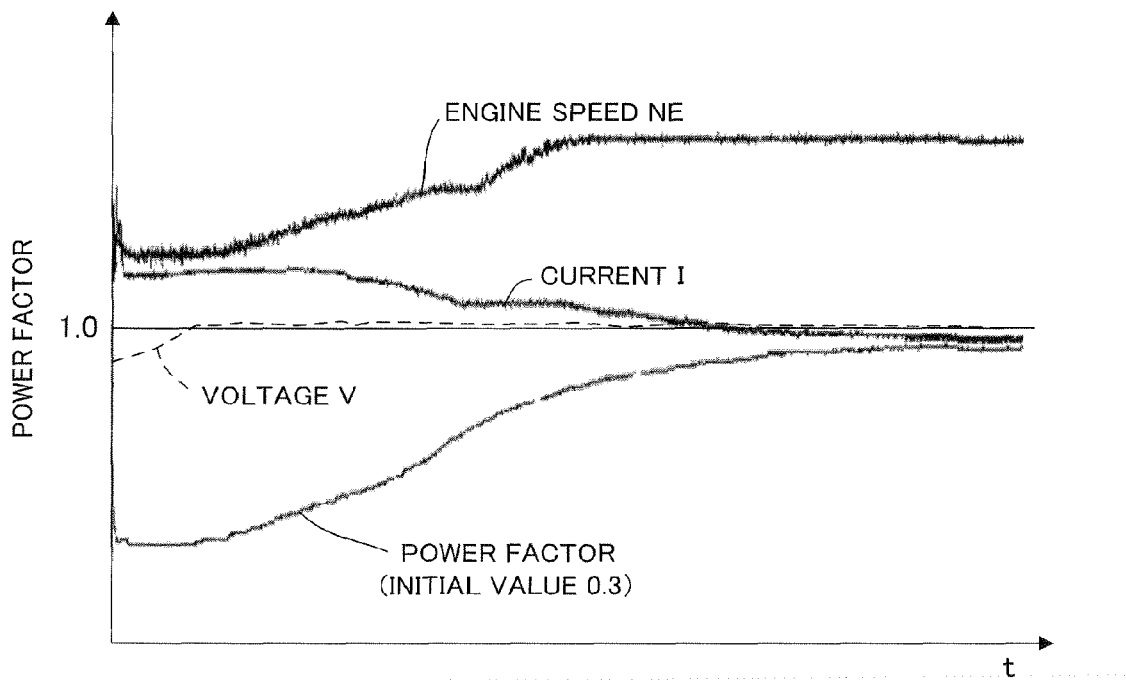
FIG. 5 is a time chart for explaining the operation of the FIG. 3 flowchart.

FIG. 5 is a time chart for explaining the operation of the FIG. 3 flowchart.

The load of a mercury lamp is exemplified in FIG. 5. Since the power factor of the mercury lamp is initially low, e.g., 0.3, until the current becomes stable, an amount of work of the engine 12 indicated by a product of the voltage, current and power factor becomes small also. Accordingly, the engine speed can be made low at starting.

As illustrated, after start, the power factor grows gradually towards 1.0 as the current supplied to the load (mercury lamp) is decreased with time and becomes stable.

In this embodiment, thus, the load power is estimated using the power factor in addition to the voltage and current, the desired engine speed is determined based thereon, and the engine 12 is controlled to the desired engine speed. With this, as shown in FIG. 5, it becomes possible to increase/decrease the engine speed in proportional to the power factor and to improve the response of the engine speed control.

Further, since the power factor is used to estimate the load power, when the power factor is low (i.e., 0.3), the engine speed is also controlled to a low speed. In other words, since the engine speed is not unnecessarily increased, the fuel consumption can be improved.

Figure 6:
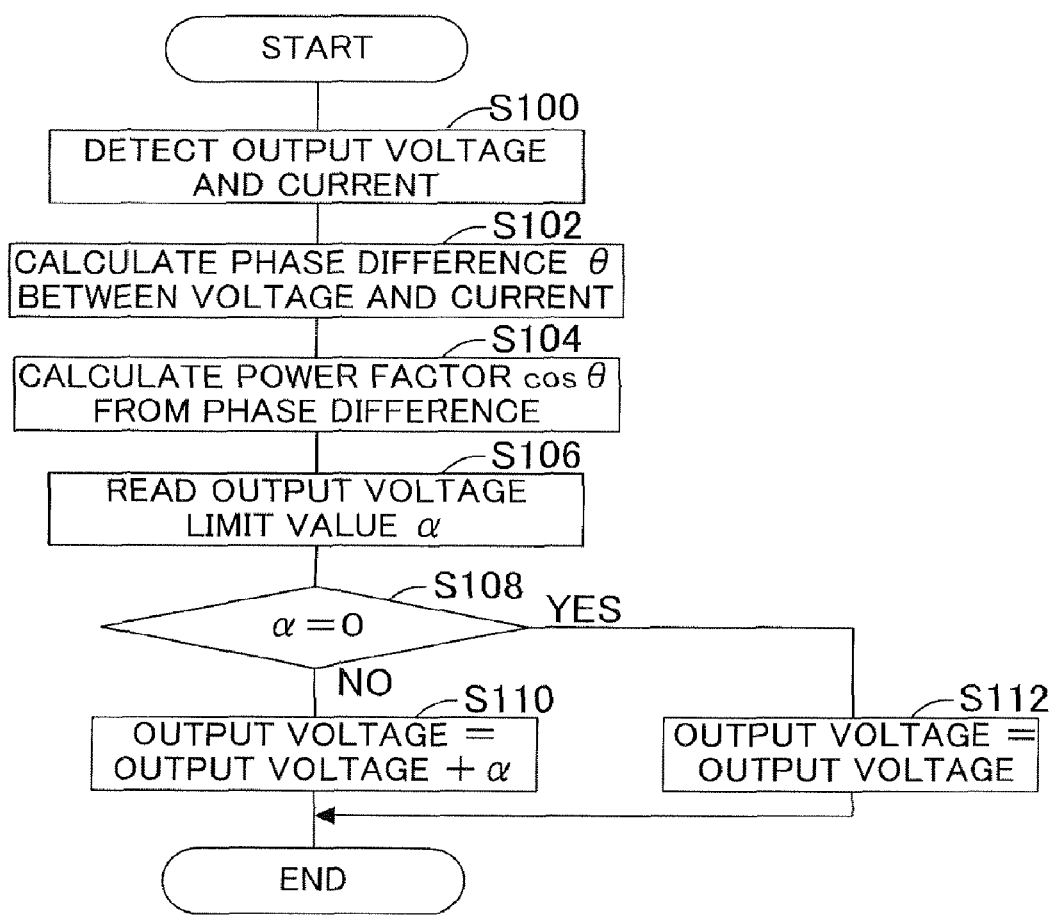
FIG. 6 is a flowchart similar to FIG. 3, but showing the operation of an inverter generator according to a second embodiment of this invention.

FIG. 6 is a flowchart showing the operation of an inverter generator according to a second embodiment of this invention, i.e., the operation of the CPU 40 thereof. The illustrated program is also executed every control cycle (step) defined by the carrier frequency.

Explaining this, similarly to the first embodiment, the program begins in S100, in which the voltage and current of the alternating current outputted from the inverter 26 are detected, and proceeds to S102, in which a phase difference θ between the detected voltage and current is calculated, and to S104, in which a power factor cos θ is calculated from the obtained phase difference θ.

The program then proceeds to S106, in which an output voltage limit value α is read. The output voltage limit value α is calculated as a negative value in a processing conducted in parallel with the processing of FIG. 6 flowchart. This will be explained later.

The program next proceeds to S108, in which it is determined whether the read output voltage limit value α is zero, and when the result is No, to S110, in which the output voltage limit value α (negative value) is added to the output voltage calculated by the PWM control (mentioned with reference to FIG. 2) to correct the output voltage to decrease. Specifically, the PWM signal in the PWM control is corrected to make the desired output voltage waveform equal to the calculated output voltage.

On the other hand, when the result in S108 is Yes, the program proceeds to S112, in which the calculated output voltage is directly determined as the output voltage.

Figure 7:
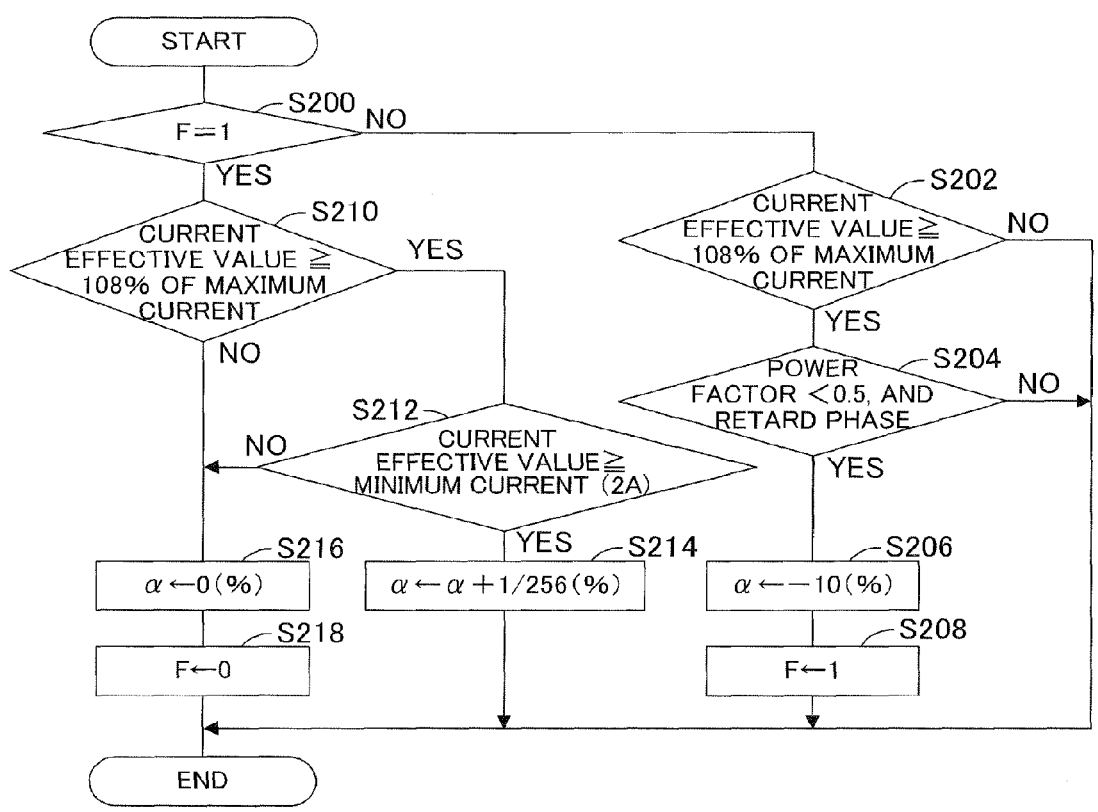
FIG. 7 is a flowchart showing the operation of calculation of output voltage limit amount conducted in parallel with the processing of the FIG. 6 flowchart.

FIG. 7 is a flowchart showing the operation of calculation of the aforementioned output voltage limit value α. The illustrated program is executed at intervals longer than that of the FIG. 6 flowchart, e.g., 8 milliseconds. A mercury lamp is also exemplified as the load of low power factor in the following.

The program begins in S200, in which it is determined whether a bit of a flag F is set to 1. Since the initial value of the bit of the flag F is zero, the result in the first loop is naturally No and the program proceeds to S202, in which it is determined whether an effective value of the detected current is equal to or greater than a prescribed value which is 108 percent of expected maximum current of the generator 10, i.e., an amount 1.08 times greater than the maximum current. The prescribed value is set to be lower than the tolerance limit used in the overcurrent limiter 40h.

When the result in S202 is No, the remaining steps are skipped and when the result is Yes, the program proceeds to S204, in which it is determined whether the power factor calculated in the FIG. 6 flowchart is less than a predetermined value, e.g., 0.5 and whether it is in the retard phase (the current retards than the voltage) based on the phase difference calculated in the FIG. 6 flowchart.

When the result in S204 is No, the remaining steps are skipped and when the result is Yes, the program proceeds to S206, in which the load (electrical load) 36 is determined to be the mercury lamp (low power factor load) and the output voltage limit value α is set to −10(%), and to S208, in which the bit of the flag F is set to 1, whereafter the program is once terminated.

Therefore, the result in S200 in the next and subsequent loops is Yes and the program proceeds to S210, in which it is determined whether the effective value of the detected current is still equal to or greater than the prescribed value (108 percent of the maximum current of the generator 10), and when the result is Yes, to S212, in which it is determined whether the effective value of the detected current is equal to or greater than 2 (A). The current 2 (A) means the expected minimum current in the abovementioned output voltage limit control.

When the result in S212 is Yes, the program proceeds to S214, in which 1/256(%) is added to α to correct α to decrease. When the result in S210 is No, the program proceeds to S216, in which the output voltage limit value α is made zero, and to S218, in which the bit of the flag F is reset to zero, whereafter the program is terminated. The same processing is conducted in the case of the No result in S212.

Figure 8:
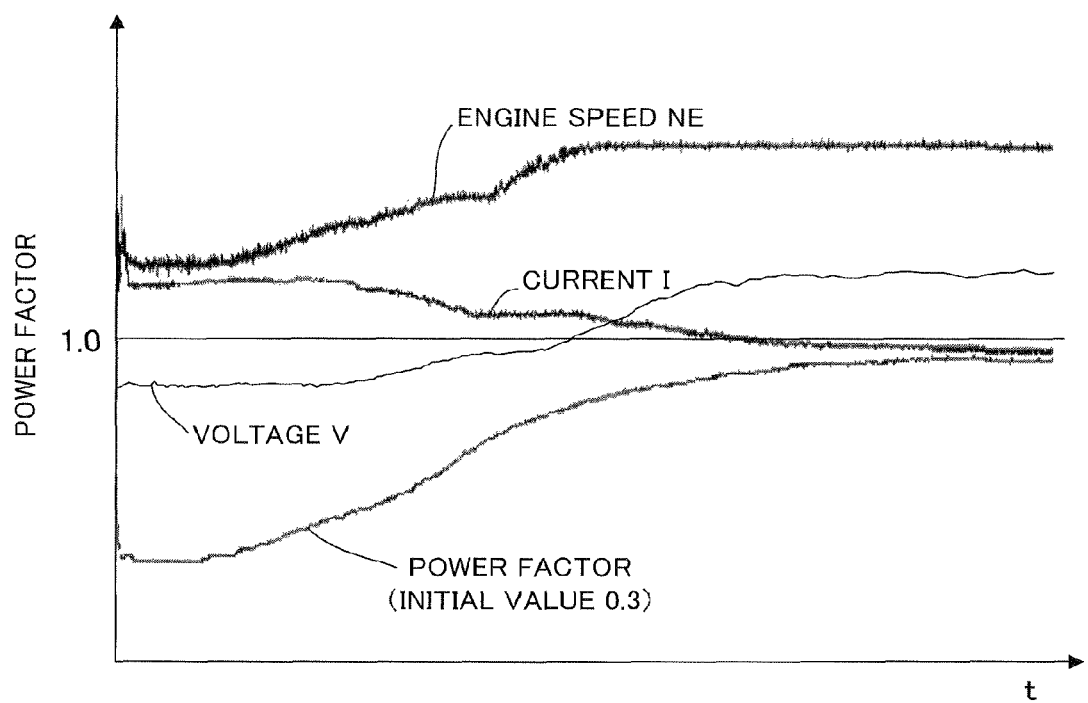
FIG. 8 is a time chart for explaining the operations of FIGS. 6 and 7.

FIG. 8 is a time chart for explaining the operations of FIGS. 6 and 7.

In the processing of the FIG. 6 flowchart, the output voltage is corrected to decrease using the output voltage limit value α. Specifically, the output voltage is decreased by α, i.e., 10% by the PWM control shown in FIG. 2 during the first 8 milliseconds.

After elapse of the first 8 milliseconds, α is corrected to gradually decrease by adding 1/256(%) to −10(%) every 8 milliseconds, and this corrected value is successively subtracted from the output voltage.

That is, the alternating current outputted by the generator 10 is represented by a product of the voltage and current (and power factor). In this embodiment, the output voltage is decreased in a lump by the output voltage limit value α of 10(%) at start. After start, the negative value is increased by an increment of 1/256(%) (in other words the value is decreased by a decrement of 1/256(%)) so that the output voltage is gradually returned to the inherent desired output voltage.

As can be seen in FIG. 8, the current supplied to the electrical load 36 is decreased with time in accordance with the so-restricted output voltage. The output voltage limit value α is experimentally determined to be an amount corresponding to the increasing current at start. In the second embodiment, the voltage is decreased by the amount corresponding to the increasing current at start by determining the output voltage limit value α to be corresponding to the increasing current.

After start, the power factor grows as the current becomes stable and the current decreases accordingly. Then the voltage is gradually returned to the inherent output voltage. The voltage can be thus returned to the desired value smoothly.

The engine speed NE remains relatively low while the mercury lamp is just lighted and the power factor stays low. As the demand to the engine 12 increases as the power factor approaches 1.0, the engine speed NE begins to rise and then becomes constant.

It should be noted here that the second embodiment is based on the first embodiment. Specifically, also in the second embodiment, the power of the load is estimated based on at least the detected current and the calculated power factor, the desired engine speed is determined based on the estimated load power, and the CPU 40 (actuator controller) controls operation of the throttle motor (actuator) 12b such that the engine speed becomes equal to the desired engine speed.

As stated above, the first embodiment is configured to have an inverter generator (10) (and a method of controlling thereof) having a generator unit (14) that is driven by an internal combustion engine (12) whose throttle valve (12a) is moved by an actuator (throttle motor 12b) and generates alternating current, a converter (20) that is connected to the generator unit and converts the alternating current to direct current, an inverter (26) that is connected to the converter and converts the direct current to alternating current with switching elements to supply to an electrical load (36), comprising: a voltage/current detector (second voltage sensor 40f, current sensor 40g, CPU 40, S10) that detects voltage and current supplied to the electrical load (36); a power factor calculator (CPU 40, S12, S14) that calculates a power factor based on the detected voltage and the current; a load power estimator (CPU 40, S16) that estimates a power of the load based on at least the detected current and the calculated power factor; a desired engine speed determiner (CPU 40, S18) that determines a desired speed of the engine based on the estimated power of the load; and an actuator controller (CPU 40) that controls operation of the actuator such that an engine speed becomes equal to the desired engine speed (S20).

In other words, since the estimated load power is calculated from the power factor, etc., instead of thyristor turn-on angle, it becomes possible to accurately estimate the load power even when the load is light. Also the desired engine speed is calculated to control the throttle motor 12b based on the estimated value, it becomes possible to improve the response of the engine speed control. Further, since the power factor is used to estimate the load power, the engine speed is not unnecessarily increased and the fuel consumption can be improved.

In the generator, the load power estimator estimates the power of the load by multiplying the detected current by the calculated power factor and a rated output voltage of the generator unit (S16), and the desired engine speed determiner determines the desired speed of the engine such that the desired speed of the engine increases with increasing estimated power of the load (S18), as illustrated in FIG. 4. With this, in addition to the above effects, it becomes possible to further accurately estimate the load power.

The second embodiment is configured to have an inverter generator (10) (and a method of controlling thereof) having a generator unit (14) that is driven by an internal combustion engine (12) whose throttle valve (12a) is moved by an actuator (throttle motor 12b) and generates alternating current, a converter (20) that is connected to the generator unit and converts the alternating current to direct current, an inverter (26) that is connected to the converter and converts the direct current to alternating current with switching elements to supply to an electrical load (36), and further including: an inverter driver (CPU 40) that drives the switching elements with a PWM signal generated using a reference sine wave of a waveform of a desired output voltage and a carrier and makes the alternating current converted in the inverter to the alternating current of a predetermined frequency; and a load power factor discriminator (CPU 40, S106, S204) that discriminates whether the calculated power factor of the load is less than a predetermined value; and the inverter driver decreases the desired output voltage by a predetermined value (output voltage limit value α) in a lump when the calculated power factor of the load is less than the predetermined value (0.5), and then decreases the desired output voltage continuously by the predetermined value which is successively reduced by a decrement ($1/256(\%)$) (S108, S110, S200 to S218).

With this, even when a load of low power factor such as the mercury lamp is connected, it becomes possible to increase the number of the loads which can be started by the rated generator output to the utmost extent.

Specifically, the outputted alternating current is represented by a product of the voltage and current (and power factor). In the second embodiment, the output voltage is decreased in a lump by a predetermined value (α of 10(%)) at start and is then gradually returned to the inherent desired output voltage. Owing to this configuration, by determining the predetermined value (the output voltage limit value α) to be an amount corresponding to the increasing current at start, the voltage can be decreased by the amount corresponding to the increasing current.

In addition, the power factor grows as the current becomes stable after start and the current decreases accordingly. By gradually returning the voltage to the inherent output voltage after start, the voltage can be thus returned to the desired value smoothly.

As can be seen in FIG. 8, the current supplied to the electrical load 36 is decreased with time in accordance with the so-restricted output voltage.

In the generator, the inverter driver decreases the desired output voltage when an effective value of the detected current is equal to or greater than a threshold value (S202), and the inverter driver decreases the desired output voltage when a phase difference between the detected voltage and current is in a retard phase (S204). With this, in addition to the above effects, it becomes possible to reliably determine whether it is a load of low power factor that needs restriction of the output voltage.

Although, in the foregoing, a mercury lamp is exemplified as the low power factor load, other load such as a refrigerator, air conditioner, pump or the like can be applicable if its initial power factor is poor and if the inrush current at start is large.

Although FETs are used as the switching elements of the inverter in the foregoing, this is not a limitation and it is possible to use insulated gate bipolar transistors (IGBTs) or the like instead.

Japanese Patent Application Nos. 2008-191781 and 2008-192782, both filed on Jul. 25, 2008, are incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An inverter generator having a generator unit that is driven by an internal combustion engine whose throttle valve is moved by an actuator and generates alternating current, a converter that is connected to the generator unit and converts the alternating current to direct current, an inverter that is connected to the converter and converts the direct current to alternating current with switching elements to supply to an electrical load, comprising:
   a voltage/current detector that detects voltage and current supplied to the electrical load;
   a power factor calculator that calculates a power factor based on the detected voltage and the current;
   a load power estimator that estimates a power of the load based on at least the detected current and the calculated power factor;
   a desired engine speed determiner that determines a desired speed of the engine based on the estimated power of the load; and
   an actuator controller that controls operation of the actuator such that an engine speed becomes equal to the desired engine speed.

2. The inverter generator according to claim 1, wherein the load power estimator estimates the power of the load by multiplying the detected current by the calculated power factor and a rated output voltage of the generator unit.

3. The inverter generator according to claim 1, wherein the desired engine speed determiner determines the desired speed of the engine such that the desired speed of the engine increases with increasing estimated power of the load.

4. The inverter generator according to claim 1, further including:
   an inverter driver that drives the switching elements with a PWM signal generated using a reference sine wave of a waveform of a desired output voltage and a carrier and makes the alternating current converted in the inverter to the alternating current of a predetermined frequency; and
   a load power factor discriminator that discriminates whether the calculated power factor of the load is less than a predetermined value;
   and the inverter driver decreases the desired output voltage by a predetermined value in a lump when the calculated power factor of the load is less than the predetermined value, and then decreases the desired output voltage continuously by the predetermined value which is successively reduced by a decrement.

5. The inverter generator according to claim 4, wherein the inverter driver decreases the desired output voltage when an effective value of the detected current is equal to or greater than a threshold value.

6. The inverter generator according to claim 4, wherein the inverter driver decreases the desired output voltage when a phase difference between the detected voltage and current is in a retard phase.

7. A method of controlling an inverter generator having a generator unit that is driven by an internal combustion engine whose throttle valve is moved by an actuator and generates alternating current, a converter that is connected to the generator unit and converts the alternating current to direct current, an inverter that is connected to the converter and converts the direct current to alternating current with switching elements to supply to an electrical load, comprising the steps of:
   detecting voltage and current supplied to the electrical load;
   calculating a power factor based on the detected voltage and the current;
   estimating a power of the load based on at least the detected current and the calculated power factor;
   determining a desired speed of the engine based on the estimated power of the load; and
   controlling operation of the actuator such that an engine speed becomes equal to the desired engine speed.

8. The method according to claim 7, wherein the step of load power estimation estimates the power of the load by multiplying the detected current by the calculated power factor and a rated output voltage of the generator unit.

9. The method according to claim 7, wherein the step of desired engine speed determination determines the desired speed of the engine such that the desired speed of the engine increases with increasing estimated power of the load.

10. The method according to claim 7, further including the steps of:
    driving the switching elements with a PWM signal generated using a reference sine wave of a waveform of a desired output voltage and a carrier to make the alternating current converted in the inverter to the alternating current of a predetermined frequency; and
    discriminating whether the calculated power factor of the load is less than a predetermined value;
    and the step of the inverter driving decreases the desired output voltage by a predetermined value in a lump when the calculated power factor of the load is less than the predetermined value, and then decreases the desired output voltage continuously by the predetermined value which is successively reduced by a decrement.

11. The method according to claim 10, wherein the step of inverter driving decreases the desired output voltage when an effective value of the detected current is equal to or greater than a threshold value.

12. The method according to claim 10, wherein the inverter driver decreases the desired output voltage when a phase difference between the detected voltage and current is in a retard phase.

* * * * *